Dec. 30, 1958   R. W. BOWMAN ET AL   2,866,593
ASPIRATING APPARATUS

Filed Jan. 28, 1954   4 Sheets-Sheet 1

INVENTORS
Robert W. Bowman
Joseph A. Neigel
BY
John T. Cilla
ATTORNEY

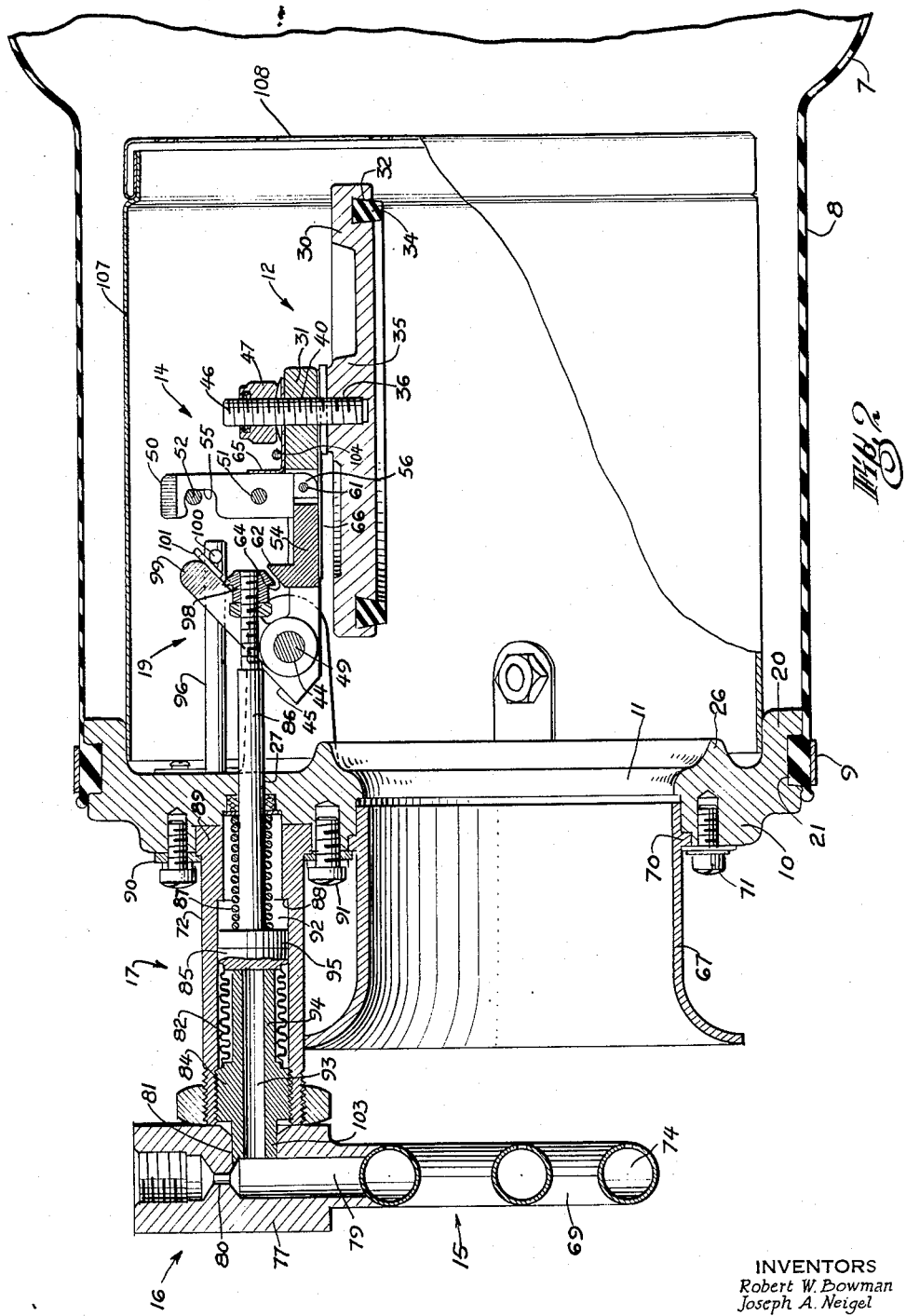

Dec. 30, 1958    R. W. BOWMAN ET AL    2,866,593
ASPIRATING APPARATUS
Filed Jan. 28, 1954    4 Sheets-Sheet 3
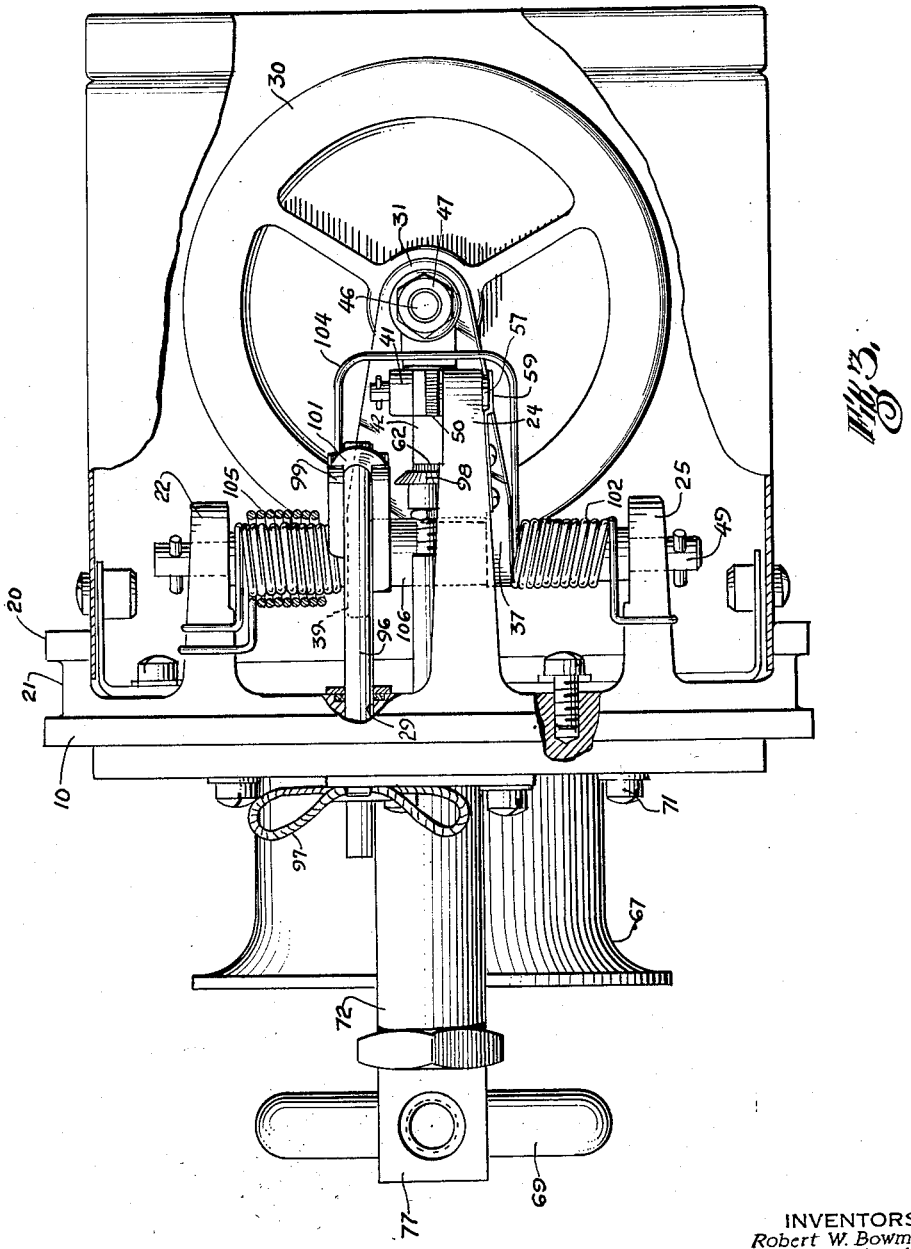
INVENTORS
Robert W. Bowman
Joseph A. Neigel
BY
ATTORNEY

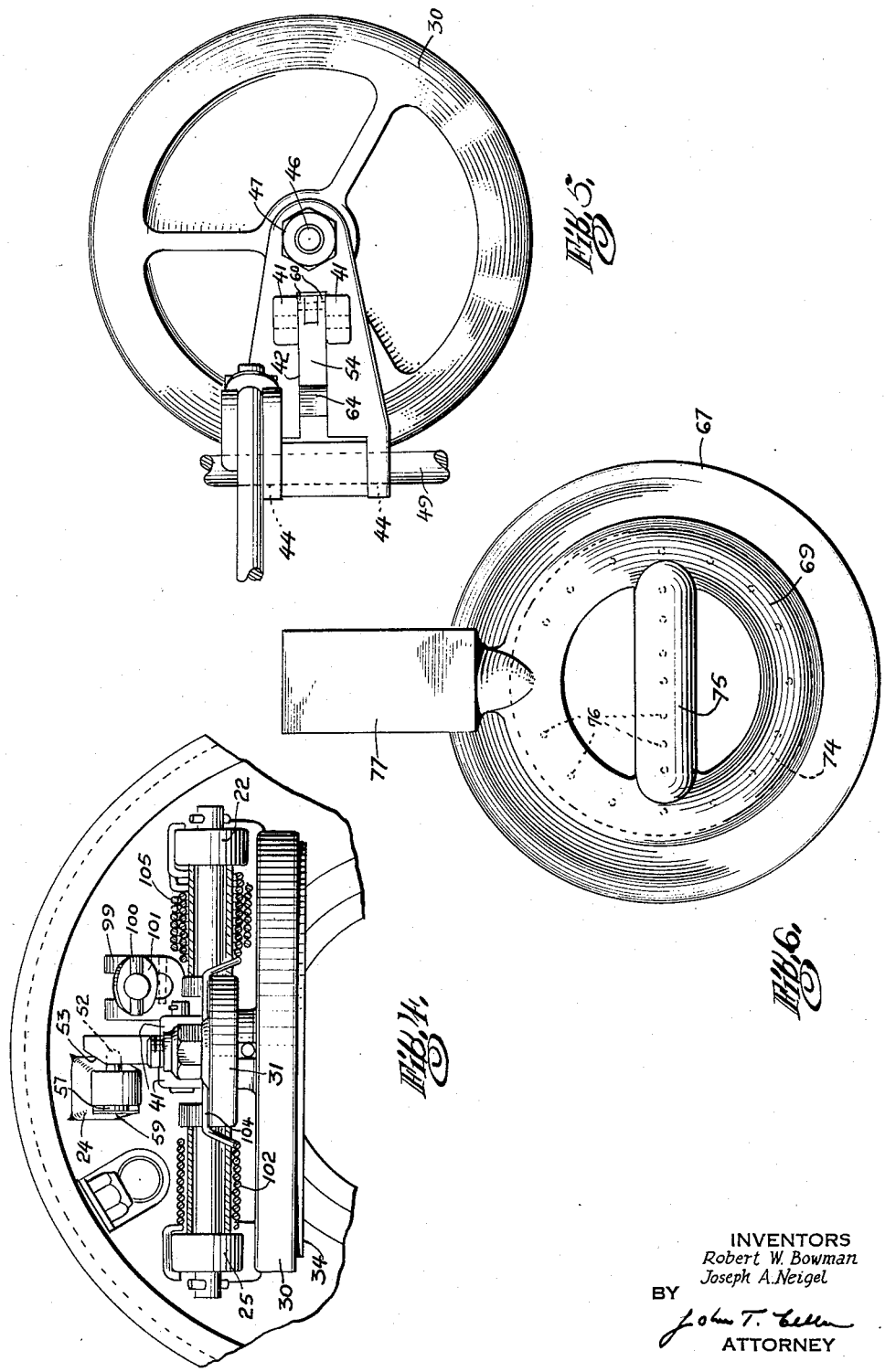

United States Patent Office 2,866,593
Patented Dec. 30, 1958

2,866,593

ASPIRATING APPARATUS

Robert W. Bowman, Oradell, and Joseph A. Neigel, Glen Rock, N. J., assignors to Specialties Development Corporation, Belleville, N. J., a corporation of New Jersey Application January 28, 1954, Serial No. 406,822

26 Claims. (Cl. 230—95)

This invention relates to inflation apparatus, and, more particularly, to aspirating apparatus for the inflation of flotation equipment such as collapsible boats, pack rafts and similar devices.

Such inflatable devices are normally maintained in collapsed, folded condition, for purposes of saving space, until it is desired to put them to use, at which time compressed air, or other gas, is admitted into the devices to inflate them. In order to effect a reduction in bulk and weight of the gas supplying apparatus, the use of aspirating apparatus has been proposed which utilizes a minimum quantity of compressed gas to aspirate a volume of ambient atmospheric air into the inflatable device.

Such aspirating apparatus included various valving mechanisms, such as spring biased check valves or piston operated valves, which depended for their operation upon utilization of a portion of the kinetic energy of the compressed gas or of the aspirated ambient air. Additional disadvantages of the proposed apparatus included a complexity of passageways for both the compressed gas and the ambient air, which passageways caused the gas and air to undergo several changes of direction and generally provided numerous flow restricting features. Each time the gas or air was required to open a valve, change direction, or do other work, there occurred losses of kinetic energy which seriously limited the efficiency and air-to-gas ratio of such apparatus.

Accordingly, an object of the present invention is to provide simple, economical and practical aspirating apparatus which overcomes the foregoing disadvantages.

Another object is to provide such apparatus which is highly efficient and capable of producing a high air-to-gas ratio.

A further object is to provide such apparatus wherein the kinetic energy of the gas and air is employed almost entirely for inflation purposes.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, the foregoing objects generally are accomplished by providing aspirating apparatus comprising, in combination, a body portion formed with an opening; closure means adapted to close the opening; aspirating means adjacent the opening; means for supplying gas under pressure to the aspirating means; means for urging the closure means to close the opening; means for normally retaining the closure means open; pressure sensitive means associated with the gas supplying means adapted to render the last mentioned means ineffective and the closure urging means effective when the gas is at a predetermined pressure; and manually controlled reset means adapted to render the closure urging means ineffective and the closure retaining means effective. The aspirating means includes a member adjacently spaced from the opening having a passageway provided with a plurality of apertures arranged to direct gas under pressure into the opening.

A preferred embodiment of the invention has been chosen for purposes of illustration and description, and is shown in the accompanying drawings, forming a part of the specification, wherein:

Fig. 2 is a longitudinal sectional view of the apparatus shown in Fig. 1 with a portion of an inflatable device secured thereto.

Fig. 3 is a plan view of the apparatus with portions thereof broken away to more clearly illustrate the closure means.

Fig. 4 is a fragmentary end view of the closure means.

Fig. 5 is a fragmentary plan view of the closure means with some of the elements removed to illustrate features of the closure means, retaining means and reset means.

Fig. 6 is an elevational view illustrating features of the aspirating means.

Figure 1:
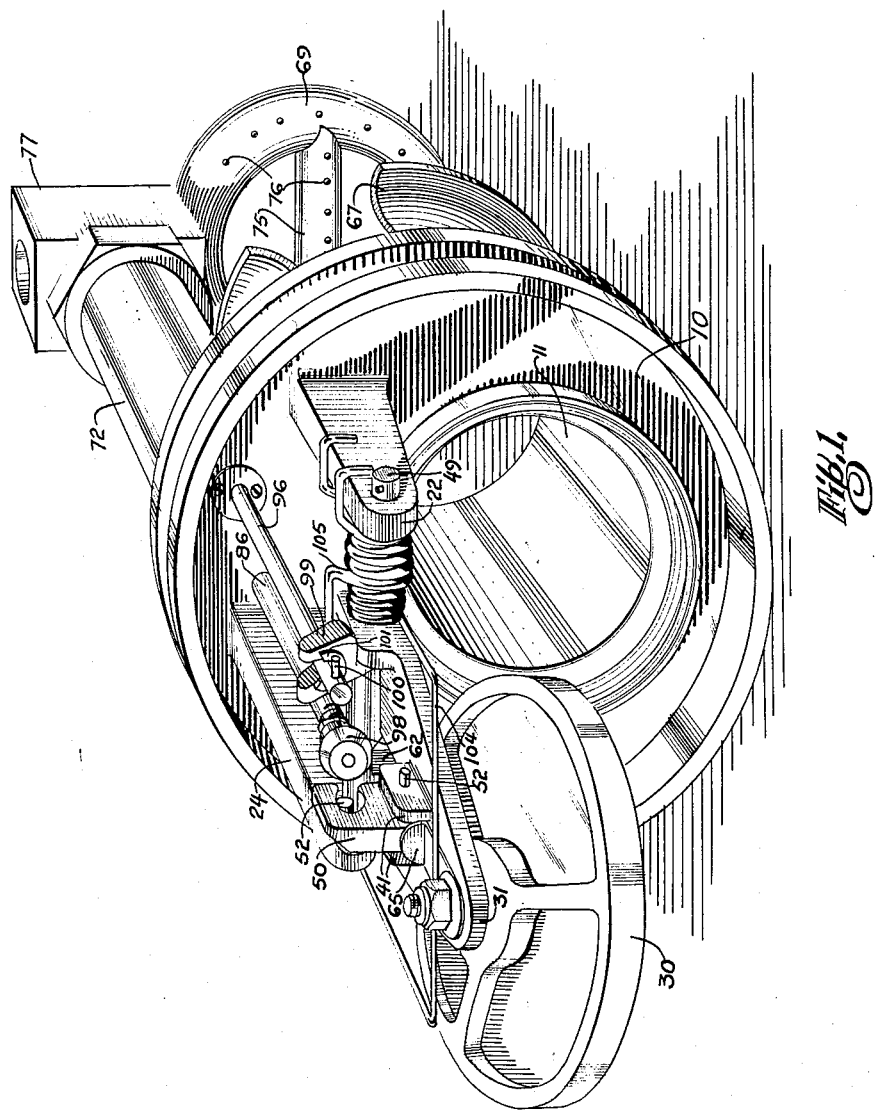
Fig. 1 is a fragmentary perspective view of aspirator apparatus in accordance with the invention.

Referring to the drawings in detail and more particularly to Figs. 1 to 3 thereof, there is shown a portion of an inflatable bag 7 having a neck 8 secured to the aspirating apparatus (Fig. 2). This apparatus, in general, comprises a body portion 10 formed with an opening 11, closure means 12 adapted to close the opening; a latch assembly 14 for normally retaining the closure means open; aspirating means 15 adjacent the opening; conduit means 16 adapted for connection to a source of gas under pressure (not shown) for supplying the gas to the aspirating means; and pressure sensitive means 17 adapted to render the latch assembly ineffective when the gas is at a predetermined pressure. Reset means 19 is also provided in order that the closure means may be returned to its original position, as shown.

The body portion 10 is a circular member having the opening 11 offset with respect to the center thereof and is formed with a cylindrical flange 20 at its periphery having an annular groove 21 for mounting therein the neck 8 of the bag 7, in a suitable manner, as by a metal strap 9. Three projections, 22, 24 and 25 (Fig. 3) are formed on the body portion at the side facing the bag 7, above the opening 11, which serve as mounts for elements of the apparatus to be described, and an annular lip 26 is formed on the side of the body portion facing the bag 7 which surrounds the opening and is adapted to serve as a seat for the closure means 12. The body portion is also provided with a pair of bores 27 and 29 (Figs. 2 and 3) extending therethrough above the opening 11, as viewed.

The closure means 12 comprises a circular door 30 and a hinge 31. The door 30 is formed with an annular groove 32 on one side thereof in which an annular rubber gasket 34 is arranged for seating on the lip 26 on the body portion to seal the opening 11. A central hub 35 is provided on the opposite side of the door and is formed with an internally threaded centrally located recess 36.

The hinge 31 is generally triangular shaped and is formed with a pair of legs 37 and 39 (Fig. 3), extending from the ends of the base, and a bore 40 therethrough adjacent the apex thereof. A pair of tabs 41 project upwardly from the hinge and a slot 42 extends from the base thereof towards the apex and passes between the tabs 41 (Fig. 5). The legs 37 and 39 are each provided, at their extremities, with a horizontal bore 44 extending therethrough. The leg 39 extends beyond its bore 44 and is provided with a flat inclined surface 45 for a purpose which will be described hereinafter.

The door and hinge are secured together by inserting a threaded pin 46 through the bore 40 in the hinge, screw threading one end thereof into the threaded recess 36 of the door hub and securing a lock nut 47 to the other end of the pin. A suitable spring washer may be used between the door and the hinge.

A pin 49, journalled at its ends in suitable bores formed in the projections 22 and 25, passes through the bores 44 in the legs 37 and 39 of the hinge, wherefore the hinge is mounted thereon for pivotal movement thereabout.

The latch assembly 14 comprises a latch member 50 pivotally mounted on a pin 51 extending therethrough and supported at its ends in the tabs 41 projecting upwardly from the hinge 31, a keeper 52 mounted in the projection 24 extending outwardly from the body portion 10, and a trigger 54 pivotally connected to the latch member.

The latch member is provided with a notch 55 at its upper end and with an extension 56 of reduced width and thickness at its lower end, which extension projects into the slot 42 of the hinge. The surface 53 of one side of the latch member is tapered inwardly and upwardly, as shown in Fig. 4.

The keeper 52 is cylindrical in shape and extends through a bore in the end of the projection 24, for engagement with the notch 55 of the latch member, and is provided with a flange 57 at one end thereof. A flat spring 59 mounted on the projection urges the keeper in a direction towards the latch member.

The trigger 54 fits into the slot 42 of the hinge and is axially slotted at one end to form a pair of prongs 60, as shown in Fig. 5, each of which extends adjacent one side of the extension 56 of the latch member. Similar bores through the prongs 60 and the extension 56 provide a passageway for a pin 61 (Fig. 2), wherefore the hinge and the trigger are connected for pivotal motion with respect to each other. The other end of the trigger is formed with a projection 62 which extends upwardly out of the slot 42 in the hinge and has an inclined surface 64 at its outer end for a purpose to be described hereinafter.

A flat spring 65 is mounted in the end of the slot 42 of the hinge 31 and extends upwardly abutting the back of the latch member 50 while a second flat spring 66 is secured to the bottom surface of the hinge and abuts the bottom of the trigger 54, the purpose of both of which will be described hereinafter.

As illustrated in Figs. 1 to 3 and 6, the aspirating means 15 comprises a cylindrical tube 67, extending from the opening 11 outwardly in a direction away from the lip 26, and a nozzle 69. The tube has an annular flange 70 extending radially outwardly thereof adjacent the body portion 10 and is flared at its opposite end. The flange is secured to the body portion by overlapping washers held down by bolts 71 and 91.

The nozzle 69 is mounted at the end of, and perpendicular to, a tubular member 72 which, in turn, is secured, at one end thereof, to the body portion adjacently above, and parallel to, the tube 67 so that the nozzle 69 is located directly in front of, but spaced from, the flared end of the tube 67. The nozzle is an annular or torus-shaped member having a passageway 74 provided with a plurality of radially disposed apertures 76 arranged to direct gas under pressure through the tube 67 and the opening 11 (Figs. 1 and 5). In the preferred embodiment of the invention, the apertures 76 in the annular or torus-shaped member lie in a circle, the diameter of which is no greater than the minimum inside diameter of the tube 67.

In order to maintain a high efficiency in larger size units, in which turbulence in the tube 67 may cause a portion of the air and gas to reverse its direction and escape through the center of the nozzle, a second member 75, provided with a plurality of apertures similar to those in the annular member, may be radially disposed within the annular member.

The conduit means 16 for supplying gas under pressure to the aspirating means includes a block 77 which is provided with a longitudinal bore 79 threaded at one end for connection to a conduit or gas supply line and is formed with a portion of reduced diameter to provide a pressure reducing orifice 80. A second bore 81 extends perpendicular to, and communicates with, the bore 79 on the downstream side of the orifice 80. The block 77 is integrally connected to the nozzle 69, serving to support the same, and the bore 79 communicates with the annular passageway 74, downstream of the orifice 80, to serve as an inlet for the nozzle.

The pressure sensitive means 17 includes the tubular member 72 which serves as a housing for an expansible bellows 82, a retainer member 84 for the bellows, a cap 85 at one end of the bellows, a shaft 86 and a spring 87.

The tubular member 72 is formed with an external annular flange 89 at one end thereof which fits into a recessed portion of the body portion 10. An annular retainer ring 90 fits around the member 72 and overlaps the flange 89 and the body portion 10 for securement thereto by bolts 91. The member 72 has a longitudinal stepped bore 92 extending therethrough providing a shoulder 88; and the retainer member 84 is secured into the end thereof away from the body portion.

The retainer member 84 is formed with a cylindrical projection 94 extending longitudinally into the bore 92 and with a second cylindrical projection 103 secured in the bore 81. A bore 93 extends through the projections 94 and 103 for a purpose to be described hereinafter.

The bellows 82 is disposed within the bore 92 of the tubular member 72 and encompasses the extension 94 of the retainer member 84, being secured, at one end, to the retainer member and at the other end to the cap 85 which normally abuts the end of the retainer member extension 94 and is longitudinally slidable in the bore 92.

The shaft 86 extends through the bore 27 in the body portion and is formed with a flange 95 at one end thereof abutting the cap 85. The other end of the shaft is of reduced diameter and is threaded for engagement with a trigger catch 98 having a beveled flange for a purpose to be described. A lock nut may be threaded onto the shaft in back of the catch 98 to lock the same in the desired position.

The spring 87 is located in the bore 92 and bears against the flange 95 at one end and against the face of the body portion 10 at the other end to urge the shaft in a direction towards the retainer member 84.

The reset means 19 comprises a rod 96 slidably mounted in the bore 29 in the body portion 10, a suitable manual grip, such as a steel cable loop 97 secured to one end of the rod, and a generally U-shaped reset lever 99 which has one arm thereof extending below the base of the U. The extended portion is provided with a bore therethrough by which it is pivotally mounted on the pin 49, adjacent the leg 39 of the hinge, and between the legs 37 and 39 thereof, and a spacer 106 is provided on the pin 49 between the leg 37 and the extended arm of the reset lever 99 to maintain the lever adjacent the leg 39 of the hinge.

The rod 96 extends between the arms of the lever 99 and a pin 100 (Figs. 2 and 4) in the end of the shaft retains a washer 101 loosely on the shaft adjacent the arms of the reset lever. The washer has an outside diameter larger than the distance between the arms for a purpose to be described hereinafter.

A torsion spring 102 is coiled about the pin 49 adjacent each of its ends and has a center portion 104 which extends away from the pin and abuts the upper surface of the hinge adjacent the nut 47 and urges the same in a downward direction, as viewed, to close the door 30.

A second torsion spring 105 is superimposed over one end of the spring 102 and bears against one surface of the reset lever 99 to urge the same into the position shown.

If desired, a cylindrical shield 107 may be secured to the flange 20 of the body portion to provide protection for the closure and reset means and a screen 108 (Fig. 2) may be provided at the outer end of the shield to keep foreign matter out of the inflatable article.

In operation, the aspirating apparatus is connected to the inflatable bag 7, or other flotation equipment as shown, and the pressurized gas supply line is connected to the bore 79 of the block 77. In its normal condition, prior to use, the apparatus is set in the position shown, with the closure means latched open.

When it is desired to inflate the bag, gas under pressure is admitted to the bore 79 of the block 77 and undergoes a pressure drop as it passes through the orifice 80. The gas then flows, at high velocity, into the nozzle 69 and into the bore 93 of the retainer member 84.

As the gas under pressure enters the bore 93, it acts against the face of the cap 85, urging the same to move in the bore 92 of the tubular member 72, in a direction away from the retainer member, thereby enabling the gas to fill and expand the bellows 82. Movement of the cap 85 causes the shaft 86 to move longitudinally in the same direction, against the action of the spring 87, until the flange 95 abuts the shoulder 88. Such motion of the shaft causes the beveled flange of the trigger catch 98 to contact the inclined surface 64 of the projection 62 on the trigger 54 and to cause the trigger to pivot downwardly about the pin 61 against the action of the flat spring 66 until the flange of the catch 98 passes beyond the projection 62. At this point, the motion of the shaft is stopped by the shoulder 88 and the spring 66 returns the trigger to its normal position with the flange portion of the catch on the side of the projection 62 towards the latch member 50.

Simultaneously, the gas entering the passageway 74 of the nozzle 69 and the passageway of member 75, is directed in jet like, parallel streams out through the spaced apertures 76 through the tube 67. The gas, passing through the tube in such manner, aspirates a large volume of ambient air at a relatively low pressure through the tube and into the bag 7 to inflate the bag.

Inflation continues until the supply pressure begins to drop, whereupon the pressure in the bellows 82 also drops, allowing the bellows to contract. The spring 87 urges the shaft 86 in a direction away from the shoulder 88. This motion continues until the flat face of the trigger catch flanges engages the flat face of the trigger projection 62 and, at a predetermined pressure, draws the trigger in a longitudinal plane towards the body portion. The trigger, being pivotally connected to the latch member 50, as described, causes the same to rock about the pin 51, against the action of the flat spring 65, until the notch 55 disengages the keeper 52 permitting the center portion 104 of the torsion spring 102 to pivot the hinge 31 downwardly about the pin 49 so that the door 30 closes the opening 11 and the gasket 34 comes to rest in sealing engagement with the lip 26 of the body portion, thereby trapping the pressurized and aspirated fluid in the inflated bag. As soon as the latch member and keeper are disengaged, the flat spring 65 causes the former to return to its original position with respect to the hinge 31.

The pressure at which the door will close the opening 11 may be varied by adjusting the position of the trigger catch 98 on the end of the shaft 86. As the catch, and its lock nut, is threaded further onto the shaft, it will engage the trigger projection 62 sooner, as the supply pressure drops, to unlatch the door.

When the hinge comes to rest in door closing position, the inclined surface 45 on the leg 39 thereof, having pivoted 90° about the pin 49, abuts the upper inclined surface of the base of the U-shaped reset lever 99.

To reset the apparatus, the cable loop 97, fixed to one end of the rod 96, is grasped and drawn in a direction away from the body portion 10, causing the rod, the pin 100 and the washer 101, to move longitudinally in the same direction. Such movement causes the washer to bear against the arms of the reset lever 99 whereby the reset lever rocks pivotally about the pin 49 and, in turn, bears against the inclined surface 45 of the hinge leg 39 to pivot the same, as well as the latch assembly 14 and the door 30, about the pin 49 to move the door in a 90° arc away from the opening 11 in the body portion, against the action of the spring 102, until the latch engages the keeper. As the cable loop is released, the spring 105 returns the reset lever, as well as the rod 96, to the position shown.

As best illustrated in Fig. 4, latching occurs when, as the latch assembly is pivoting away from door closing position, the surface 53 of the latch member engages the keeper 52 urging the same to the left, as viewed, against the action of the flat spring 59, until the notch 55 is opposite the keeper, at which point the keeper is urged by the spring 59 into the notch to retain the latch member. The flange 57, at one end of the keeper, abuts the projection 24 and prevents the keeper from moving out of the bore in which it is mounted.

Resetting of the apparatus completes a cycle of operation and prepares the apparatus for subsequent use.

From the foregoing description, it will be seen that the present invention provides an improved, highly efficient aspirating apparatus which is simple, economical and practical and which is capable of producing a relatively high air-to-gas ratio. It will further be seen that apparatus according to the present invention utilizes the kinetic energy of the gas and air almost entirely for inflation purposes.

While the apparatus in accordance with the present invention has been described in connection with inflating flotation equipment by way of illustration, it will be understood that such apparatus is suitable for any other use where it is desired to admix air with the aspirating fluid and introduce the mixture thereof into an enclosure or confined zone.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. Aspirating apparatus comprising, in combination, a body portion formed wtih an opening, closure means mounted on said body portion for closing said opening, aspirating means positioned adjacent said opening for directing gas under pressure through said opening, means supported by said body portion for supplying gas under pressure to said aspirating means, means on said body portion for normally retaining said closure means open, and pressure sensitive means in fluid flow communication with said gas supplying means and operatively engaging said retaining means to render said retaining means ineffective when said gas is at a predetermined pressure.

2. Aspirating apparatus comprising, in combination, a body portion formed with an opening, closure means mounted on said body portion for sealing said opening, means mounted on said body portion for urging said closure means to seal said opening, aspirating means positioned adjacent said opening for directing gas under pressure through said opening, means supported by said body portion for supplying gas under pressure to said aspirating means, means on said body portion for normally retaining said closure means open, and pressure sensitive means in fluid flow communication with said gas supplying means and operatively engaging said retaining means to render said retaining means ineffective when said gas is at a predetermined pressure.

3. Aspirating apparatus comprising, in combination, a body portion formed with an opening, closure means mounted on said body portion for sealing said opening, aspirating means positioned adjacent said opening for directing gas under pressure through said opening, means supported by said body portion for supplying gas under pressure to said aspirating means, latch means mounted on said closure means for normally retaining said closure means open, and pressure sensitive means in fluid flow communication with said gas supplying means and operatively engaging said latch means to render said latch means ineffective when said gas is at a predetermined pressure.

4. Aspirating apparatus comprising, in combination, a body portion formed with an opening, closure means mounted on said body portion for sealing said opening, means mounted on said body portion for urging said closure means to seal said opening, aspirating means positioned adjacent said opening for directing gas under pressure through said opening, means supported by said body portion for supplying gas under pressure to said aspirating means, keeper means on said body portion, a latch member mounted on said closure means adapted to engage said keeper means to retain said closure means open, and pressure sensitive means in fluid flow communication with said gas supplying means and operatively engaging said latch member to render said latch member ineffective and said closure urging means effective when said gas is at a predetermined pressure.

5. Aspirating apparatus comprising, in combination, a body portion formed with an opening, closure means mounted on said body portion for sealing said opening, aspirating means positioned adjacent said opening for directing gas under pressure through said opening, means supported by said body portion for supplying gas under pressure to said aspirating means, means on said body portion for normally retaining said closure means open, release means on said closure means operatively engaging said retaining means to render the same ineffective, and pressure sensitive means in fluid flow communication with said gas supplying means and operatively engaging said release means to render said release means effective when said gas is at a predetermined pressure.

6. Aspirating apparatus comprising, in combination, a body portion formed with an opening, closure means mounted on said body portion for sealing said opening, means mounted on said body portion for urging said closure means to seal said opening, aspirating means positioned adjacent said opening for directing gas under pressure through said opening, means supported by said body portion for supplying gas under pressure to said aspirating means, latch means for normally retaining said closure means open, a trigger connected to said latch means for rendering said latch means ineffective, and pressure sensitive means in fluid flow communication with said gas supplying means and engaging said trigger to render said trigger effective when said gas is at a predetermined pressure.

7. Aspirating apparatus comprising, in combination, a body portion formed with an opening, closure means mounted on said body portion for sealing said opening, means mounted on said body portion for urging said closure means to seal said opening, aspirating means positioned adjacent said opening for directing gas under pressure through said opening, means supported by said body portion for supplying gas under pressure to said aspirating means, keeper means on said body portion, a latch member pivotally mounted on said closure means adapted to engage said keeper means to retain said closure means open, a trigger connected to said latch means for rendering said latch member ineffective, and pressure sensitive means in fluid flow communication with said gas supplying means and engaging said trigger to render said trigger effective when said gas is at a predetermined pressure.

8. Aspirating apparatus comprising, in combination, a body portion formed with an opening, closure means mounted on said body portion for sealing said opening, means mounted on said body portion for urging said closure means to seal said opening, aspirating means positioned adjacent said opening for directing gas under pressure through said opening, means supported by said body portion for supplying gas under pressure to said aspirating means, latch means mounted on said closure means for normally retaining said closure means open, a trigger connected to said latch means for rendering said latch means ineffective, a cylinder mounted on said body portion, pressure responsive means in said cylinder in fluid flow communication with said gas supplying means, and a shaft connected at one end to said pressure responsive means and formed with means for engaging said trigger at its other end to render said trigger effective when said gas is at a predetermined pressure.

9. Aspirating apparatus comprising, in combination, a body portion formed with an opening, closure means pivotally mounted on said body portion for sealing said opening, spring means mounted on said body portion for urging said closure means to seal said opening, aspirating means positioned adjacent said opening for directing gas under pressure through said opening, means supported by said body portion for supplying gas under pressure to said aspirating means, keeper means on said body portion, a latch member pivotally mounted on said closure means adapted to engage said keeper means to retain said closure means open, a trigger pivotally mounted on said latch member for effecting disengagement of said latch member and said keeper means, a cylinder mounted on said body portion and having an inlet in fluid flow communication with said gas supplying means, bellows responsive to the pressure of said gas having an end wall in said cylinder, and a shaft having one end abutting said end wall and engaging said trigger at its other end to render said trigger effective when said gas is at a predetermined pressure.

10. Aspirating apparatus comprising, in combination, a body portion formed with an opening, closure means pivotally mounted on said body portion for sealing said opening, spring means mounted on said body portion for urging said closure means to seal said opening, aspirating means positioned adjacent said opening for directing gas under pressure through said opening, means supported by said body portion for supplying gas under pressure to said aspirating means, keeper means on said body portion, a latch member pivotally mounted on said closure means adapted to engage said keeper means to retain said closure means open, means on said body portion for urging said latch member into keeper engagement, a trigger formed with a projection pivotally mounted on said latch member for effecting disengagement of said latch member and said keeper means to render said spring means effective, a cylinder mounted on said body portion and having an inlet in fluid flow communication with said gas supplying means, bellows responsive to the pressure of said gas having an end wall in said cylinder, a shaft having one end abutting said end wall and provided with a projection at its other end formed to engage said trigger projection, spring means for normally urging said shaft in a direction to cause said projections to engage to render said trigger effective when said pressure is at a predetermined value, and means on said closure means for urging said trigger into projection engaging position.

11. Aspirating apparatus comprising, in combination, a body portion formed with an opening, closure means mounted on said body portion for closing said opening, nozzle means positioned adjacent said opening for directing gas under pressure towards said opening, air flow inducing means mounted on said body portion between said nozzle means and said opening adapted to deviler a volume of air through said opening, means supported by said body portion for supplying gas under pressure to said nozzle means, means on said body portion for normally retaining said closure means open, and pressure sensitive means in fluid flow communication with said gas supplying means and operatively engaging said retaining means to render said retaining means ineffective when said gas is at a predetermined pressure.

12. Aspirating apparatus comprising, in combination, a body portion formed with an opening, closure means mounted on said body portion for closing said opening, nozzle means positioned adjacent said opening formed with aperture means for directing gas under pressure towards said opening, air flow inducing means mounted on said body portion and extending between said nozzle means and said opening adapted to deliver a volume of air through said opening, means supported by said body portion for supplying gas under pressure to said nozzle means, means on said body portion for normally retaining said closure means open, and pressure sensitive means in fluid flow communication with said gas supplying means operatively engaging said retaining means to render said retaining means ineffective when said gas is at a predetermined pressure.

13. Aspirating apparatus comprising, in combination, a body portion formed with an opening, closure means mounted on said body portion for sealing said opening, a torus-shaped member positioned adjacent said opening provided with an annular passageway, a plurality of apertures in said member for directing gas under pressure towards said opening, air flow inducing means mounted on said body portion and extending between said member and said opening adapted to deliver a volume of air through said opening, means supported by said body portion for supplying gas under pressure to said passageway, means on said body portion for normally retaining said closure means open, and pressure sensitive means in fluid flow communication with said gas supplying means and operatively engaging said retaining means to render said retaining means ineffective when said gas is at a predetermined pressure.

14. Aspirating apparatus comprising, in combination, a body portion formed with an opening, closure means mounted on said body portion for sealing said opening, a torus-shaped member positioned adjacent said opening provided with an annular passageway, a second member having a passageway radially disposed within said first mentioned member in fluid flow communication with said first mentioned passageway, a plurality of apertures in said members for directing gas under pressure towards said opening, air flow inducing means mounted on said body portion between said members and said opening adapted to deliver a volume of air through said opening, means supported by said body portion for supplying gas under pressure to said passageways, means on said body portion for normally retaining said closure means open, and pressure sensitive means in fluid flow communication with said gas supplying means and operatively engaging said retaining means to render said retaining means ineffective when said gas is at a predetermined pressure.

15. Aspirating apparatus comprising, in combination, a body portion formed with an opening, closure means mounted on said body portion for sealing said opening, nozzle means positioned adjacent said opening for directing gas under pressure towards said opening, a tube mounted in said opening and extending towards said nozzle means adapted to deliver a volume of air through said opening, means supported by said body portion for supplying gas under pressure to said nozzle means, means on said body portion for normally retaining said closure means open, and pressure sensitive means in fliud flow communication with said gas supplying means and operatively engaging said retaining means to render said retaining means ineffective when said gas is at a predetermined pressure.

16. Aspirating apparatus comprising, in combination, a body portion formed with an opening, closure means mounted on said body portion for sealing said opening, a torus-shaped member positioned adjacent said opening provided with an annular passageway, a second member having a passageway radially disposed within said first mentioned member in fluid flow communication with said first mentioned passageway, a plurality of apertures in said members adapted to direct gas under pressure towards said opening, a tube mounted in said opening and extending towards said members adapted to deliver a volume of air through said opening, means supported by said body portion for supplying gas under pressure to said passageways, means on said body portion for normally retaining said closure means open, and pressure sensitive means in fluid flow communication with said gas supplying means and operatively engaging said retaining means to render said retaining means ineffective when said gas is at a predetermined pressure.

17. Aspirating apparatus comprising, in combination, a body portion formed with an opening, closure means mounted on said body portion for closing said opening, aspirating means positioned adjacent said opening for directing gas under pressure through said opening, means supported by said body portion for supplying gas under pressure to said aspirating means, means on said body portion for urging said closure means to close said opening, means on said body portion for normally retaining said closure means open, pressure sensitive means in fluid flow communication with said gas supplying means and operatively engaging said retaining means to render said retaining means ineffective and said closure urging means effective when said gas is at a predetermined pressure, and manually controlled reset means mounted on said body portion for rendering said closure urging means ineffective and said closure retaining means effective.

18. Aspirating apparatus comprising, in combination, a body portion formed with an opening, hinge means mounted on said body portion, a closure mounted on said hinge means for closing said opening, aspirating means positioned adjacent said opening for directing gas under pressure through said opening, means supported by said body portion for supplying gas under pressure to said aspirating means, means on said body portion for urging said closure in a direction to close said opening, means on said body portion for normally retaining said closure open, pressure sensitive means in fluid flow communication with said gas supplying means and operatively engaging said retaining means to render said retaining means ineffective and said closure urging means effective when said gas is at a predetermined pressure, and manually controlled reset means including a lever mounted on said body portion for engaging said hinge means and move the same against the influence of said closure urging means to render said retaining means effective.

19. Aspirating apparatus comprising, in combination, a body portion formed with an opening, hinge means pivotally mounted on said body portion, a closure mounted on said hinge means for sealing said opening, aspirating means positioned adjacent said opening for directing gas under pressure through said opening, means supported by said body portion for supplying gas under pressure to said aspirating means, means on said body portion for urging said closure in a direction to seal said opening, means on said body portion for normally retaining said closure open, pressure sensitive means in fluid flow communication with said gas supplying means operatively engaging said retaining means to render said retaining means ineffective and said closure urging means effective when said gas is at a predetermined pressure, a lever pivotally mounted on said body portion for engaging said hinge means to move the same against the influence of said closure urging means to render said retaining means effective, and a shaft provided with gripping means at one end thereof slidably journalled in said body portion for engaging said lever at the other end thereof to effect pivotal movement thereof.

20. Aspirating means comprising, in combination, a body portion formed with an opening, hinge means pivotally mounted on said body portion, a closure mounted on said hinge means for sealing said opening, aspirating means positioned adjacent said opening for directing gas under pressure through said opening, means supported by said body portion for supplying gas under pressure to said aspirating means, means on said body portion for urging said closure towards said opening to seal the same, latch means on the hinge means for normally retaining said closure means open, a trigger connected to said latch means for rendering said latch means ineffective, pressure sensitive means in fluid flow communication with said gas supplying means and engaging said trigger to render said trigger effective when said gas is at a predetermined pressure, and reset means including a lever mounted on said body portion for engaging said hinge means and move the same in a direction against the influence of said closure urging means to render said latch means effective.

21. Aspirating means comprising, in combination, a body portion formed with an opening, hinge means pivotally mounted on said body portion, a closure mounted on said hinge means for sealing said opening, aspirating means positioned adjacent said opening, means for directing gas under pressure through said opening for supplying gas under pressure to said aspirating means, means on said body portion for urging said closure towards said opening to seal the same, latch means on the hinge means for normally retaining said closure means open, a trigger connected to said latch means for rendering said latch means ineffective, pressure sensitive means in fluid flow communication with said gas supplying means and engaging said trigger to render said trigger effective when said gas is at a predetermined pressure, a lever pivotally mounted on said body portion for engaging said hinge means to move the same against the influence of said closure urging means to render said latch means effective, and a shaft provided with gripping means at one end thereof slidably journalled in said body portion for engaging said lever at the other end thereof to effect pivotal movement thereof.

22. Aspirating means comprising, in combination, a body portion formed with an opening, an annular member adjacently spaced outwardly from said opening to provide an air space between said annular member and said opening and having a passageway provided with a plurality of circumferentially spaced outlet apertures arranged to direct gas under pressure through said opening, and means for supplying gas under pressure to said passageway.

23. Aspirating means comprising, in combination, a body portion formed with an opening, an annular member having a passageway adjacently spaced outwardly from said opening, a second member radially disposed within said first member having a passageway in fluid flow communication with said first mentioned passageway, a plurality of apertures in said members arranged to direct gas under pressure through said opening, and means for supplying gas under pressure to said passageways.

24. Aspirating means comprising, in combination, a body portion formed with an opening, a tube mounted in said opening having an open end, an annular member having a passageway adjacently spaced outwardly from said open end of said tube, a plurality of circumferentially spaced apertures in said member arranged to direct gas under pressure through said tube and said opening, and means for supplying gas under pressure to said passageway.

25. Apparatus according to claim 24, wherein the end of said tube adjacent said member is flared outwardly.

26. Aspirating apparatus comprising, in combination, a body portion formed with an opening, a tube mounted in said opening, a torus-shaped member having a passageway adjacently outwardly spaced from one end of said tube, a second member radially disposed within said first member having a passageway in fluid flow communication with said first mentioned passageway, a plurality of apertures in said members arranged to direct gas under pressure through said tube and said opening, said tube being flared outwardly at its end adjacent said member, said apertures in said member being disposed on the locus of a circle having a diameter no greater than the minimum inside diameter of said tube, and means for supplying gas under pressure to said passageways.

References Cited in the file of this patent

UNITED STATES PATENTS

| 467,427 | McClave | Jan. 19, 1892 |
| 871,209 | Cotton | Nov. 19, 1907 |
| 1,458,810 | Dawley | June 12, 1923 |
| 1,805,370 | Meyer | May 12, 1931 |
| 2,399,670 | Freygang | May 7, 1946 |
| 2,628,020 | Koch | Feb. 10, 1953 |